(12) United States Patent
Lim et al.

(10) Patent No.: US 7,418,505 B2
(45) Date of Patent: Aug. 26, 2008

(54) IP ADDRESS LOOKUP USING EITHER A HASHING TABLE OR MULTIPLE HASH FUNCTIONS

(75) Inventors: Hyesook Lim, Seoul (KR); Yeo-jin Chung, Seoul (KR)

(73) Assignee: EWHA University Industry Collaboration Foundation, Seoul (KR)

( * ) Notice: Subject to any disclaimer, the term of this patent is extended or adjusted under 35 U.S.C. 154(b) by 752 days.

(21) Appl. No.: 10/853,185

(22) Filed: May 26, 2004

(65) Prior Publication Data
US 2004/0255045 A1 Dec. 16, 2004

(30) Foreign Application Priority Data
May 26, 2003 (KR) .................. 10-2003-0033453
Nov. 4, 2003 (KR) .................. 10-2003-0077774

(51) Int. Cl.
*G06F 15/173* (2006.01)
*G06F 15/16* (2006.01)

(52) U.S. Cl. .................. 709/226; 709/237; 709/245; 370/235; 370/235.1; 370/395.1; 707/6

(58) Field of Classification Search ......... 709/225–226, 709/237–238, 245–246; 707/6–7; 370/235–236, 370/394–399
See application file for complete search history.

(56) References Cited

U.S. PATENT DOCUMENTS

| | | | | |
|---|---|---|---|---|
| 6,658,482 B1 * | 12/2003 | Chen et al. | .................. | 709/245 |
| 6,956,858 B2 * | 10/2005 | Hariguchi et al. | ...... | 370/395.31 |
| 7,031,320 B2 * | 4/2006 | Choe | ..................... | 370/395.31 |
| 7,089,240 B2 * | 8/2006 | Basso et al. | .................... | 707/6 |
| 7,246,231 B2 * | 7/2007 | Tariq et al. | .................. | 713/162 |
| 7,304,994 B2 * | 12/2007 | Dubnicki et al. | ............ | 370/392 |

* cited by examiner

*Primary Examiner*—Bharat N Barot
(74) *Attorney, Agent, or Firm*—Oblon, Spivak, McClelland, Maier & Neustadt, P.C.

(57) ABSTRACT

The present invention relates to an IP address lookup method and hardware architecture. There is provided an IP address lookup method using a hashing table, the hashing table being constructed with an SRAM, the hashing table including main tables and sub-tables corresponding to prefix lengths of the IP address, entries being stored in the main tables and the sub-tables, the method comprising steps of: (a) performing a hashing process on an incoming IP address based on the prefix lengths of the IP address by using a hashing hardware unit, wherein the hashing hardware unit is constructed based on the prefix lengths of the IP address; (b) comparing prefixes, each of which is stored at a location in the main table pointed by a hashing value with the prefix of the IP address, searching entries of the main table having the prefix matched with the prefix of the IP address, and forwarding information on prefix-matched entries; (c) if there is no prefix-matched entry as a result of Step (b), searching entries of the sub-table having the prefix matched with the prefix of the IP address starting from a location in the sub-table pointed by a pointer of the main table, and forwarding information on prefix-matched entries; and (d) searching an entry having the longest-matched-prefix among the prefix-matched entries by using the information forwarded in Steps (b) and (c). Accordingly, it is possible to perform an IP address lookup process on all the prefixes in parallel by classifying prefixes based on the prefix lengths and constructing separate tables corresponding to the classified prefix lengths of the IP address. As a result, it is possible to easily apply a hashing process to the IP address and to reduce searching time.

48 Claims, 9 Drawing Sheets

IP ADDRESS LOOKUP USING EITHER A HASHING TABLE OR MULTIPLE HASH FUNCTIONS

BACKGROUND OF THE INVENTION

1. Field of the Invention

The present invention relates to an IP address lookup method and hardware architecture using hashing, and more particularly to an IP address lookup method and hardware architecture for classifying prefixes based on the prefix lengths, constructing separate tables corresponding to the classified prefix lengths of the IP address, performing an IP address lookup process on the tables by applying hash functions in parallel, and selecting entries having the longest-matched-prefix among the prefix-matched entries.

2. Description of the Related Art

One of the most challenging tasks that should be performed in the Internet routers widely used in the world is to accurately forward a received packet to its destination. In order to implement the task, every router comprises a forwarding table. Information on next hop addresses and output ports used to access the destination are obtained by using the forwarding table. When the packet is received, the router performs a process for referring to the forwarding table by using the Network Part of the destination IP addresses of the received packet as a key. This is called an address lookup process. The Network Part used for the address lookup process is called a prefix.

Conventionally, there is a classful addressing scheme for the IP address lookup process. In the scheme, the lengths of the prefixes of the IP address are fixed in 8, 16, or 24 bits. Since the lengths of the prefixes are fixed, the class-ful addressing scheme has a problem in that some of the IP addresses are wasted. In addition, the scheme has another problem in that, as the kinds of the networks are increasing, the size of the forwarding table has to exponentially increase.

In order to solve the problems of the classful addressing scheme, there is proposed a classless inter-domain routing (CIDR) scheme. In the CIDR scheme, since the lengths of the prefixes are not fixed, it is possible to prevent the IP addresses from wasting. In addition, since IP addresses can be aggregated, it is possible to prevent the size of the forwarding table from rapidly increasing. However, the CIDR scheme has a problem in that the so-called longest prefix matching process has to be performed. Since an incoming packet does not carry information on the prefix length of its own final network, a process has to be performed to search an entry having the longest prefix among the entries of the forwarding table having prefixes matched with the prefix of the address of the incoming packet. In other words, various IP address lookup processes conventionally used for the exact matching cannot be adapted to the longest prefix matching scheme. As a result, there are generated bottlenecks at the router.

There are several criteria used to estimate performance of an IP address lookup architecture. The first criterion is the number of memory accesses. Since the rapid IP address lookup is required in order to cope with the increase in the link speed, it is important to reduce the number of memory accesses, which may result in the most principal factor of overhead. The second criterion is the memory size. For example, in case of a backbone router, as the number of networks connected to the backbone router is exponentially increasing, the number of entries that should be stored in the forwarding table is also rapidly increasing. Therefore, it is necessary to effectively store the increasing entries in the memory, so that the IP address lookup process can be efficiently performed. As a result, the memory size becomes one of the principal factors in the IP address lookup process. The other criteria include table updatability for adding new prefixes or removing unused prefixes in the forwarding and an expandability to the IPv6 having a 128-bit address system.

Recently, various approaches for IP address lookup in the Internet router have been developed. The various approaches for IP address lookup may be classified as follows.

A first approach is an IP address lookup process using a content addressable memory (CAM). This approach has been used for an actual switch or router. The input IP address is directly compared with all the prefixes stored in the content addressable memory, so that the speed of the IP address lookup process is very high. However, there is a problem in that the technique associated with the content addressable memory has not coped with the rapidly increasing number of prefixes used for the router. In other words, in comparison with a RAM having the same memory size, the content addressable memory stores a very small number of prefixes. In addition, the cost of the content addressable memory is too high. Therefore, it is difficult to implement the content addressable memory for storing several ten-thousands of prefixes. In addition, it is difficult to embed the even implemented content addressable memory in a chip designed for the IP address lookup process. Therefore, it is difficult to apply the technique associated with the content addressable memory to the forwarding tables of a backbone router having several ten-thousands of entries and the IPv6 having addresses of 128-bit length.

A second approach is an IP address lookup process based on a Trie structure. The Trie structure is the most well-known data structure based on a tree which represents relationship between prefixes very well. In the Trie structure, every prefixes is located at a single node in the tree, which defines a path from a root node. Many researches have been made on architectures of storing the Trie structure in a memory and the associated IP address lookup schemes. However, the second approach has a problem in that the memory is wasted since prefix-unassigned internal nodes are stored. In addition, there is a problem in that W times of memory accesses are performed assuming that W is the height of the tree. In addition, it is difficult to perform an updating process to add new prefixes and remove unused prefixes.

There is proposed a Trie structure capable of reducing the number of memory accesses by using prefix expansion. In the Trie structure, a set of D prefix lengths is expanded into another set of L prefix lengths (D>L), so that some portion of prefix lengths can be expanded to reduce the number of different sets of the prefix lengths. In addition, there is proposed another Trie structure capable of performing a primary searching process in a memory having $2^{24}$ entries obtained by expanding the shorter-than-24 prefix lengths to 24 prefix lengths. In the Trie structure, when the incoming address has a longer-than-24 prefix length, the searching process is performed on another table storing the remaining longer-than-24 prefix lengths. Even though the maximum number of memory accesses is advantageously only 2, the Trie structure has a problem in that a large-sized memory of 33 Mbytes is used to store $2^{24}$ entries.

On the other hand, there is proposed another Trie structure where a forwarding table is constructed with a memory having $2^{16}$ entries obtained by expanding the shorter-than-16 prefix lengths to 16 prefix lengths. In the Trie structure, when the incoming address has longer-than-16 prefix lengths, a process for searching the longer-than-16 prefixes lengths is performed along sub-trees. Although it has an advantage in the smaller memory can be used compared with the aforementioned architectures, the IP address lookup architecture using the Trie structure has a problem in that the amount of pre-processing increases and the updating process is difficult.

A third approach is an IP address lookup process using a binary search combined with a hashing applied to prefixes of the same length. The hashing has been popularly used for Layer-2 address lookup which requires exact matching. However, the binary searching combined hashing scheme has a problem in that a pure binary searching process can not apply. In other words, even in a case where the entry searched by the hashing does not include a prefix, a large number of markers indicating that a longer prefix exists have to be stored due to the longest prefix matching characteristics of the IP address. Therefore, there is a problem in that overhead is induced to calculate the large number of markers in advance. In addition, since it is based on an assumption that a perfect hash function can be rapidly obtained with respect to a given prefix distribution, the binary searching combined hashing scheme is not practical.

In order to solve the problem that it takes too long time to search the perfect hash function, there is still another scheme for searching multiple hash functions in accordance with the data distribution instead of the perfect hash function. Recently, some research has been made to implement a semi-perfect hashing scheme by using the multiple hash functions and generating tables for the corresponding hash functions.

SUMMARY OF THE INVENTION

An object of a first aspect of the present invention is to provide an IP address lookup method and hardware architecture for performing an IP address lookup process in parallel on all the prefix lengths using separate hash functions corresponding to prefix lengths, and selecting the longest-matched-prefix among the matched prefixes.

Another object of a first aspect of the present invention is to provide an IP address lookup method and hardware architecture capable of performing an IP address lookup process by using a hash function implemented with exclusive OR without assumption of a perfect hash function and solving the collisions associated with the hashing process by using a sub-table.

An object of a second aspect of the present invention is to provide an IP address lookup method and hardware architecture using multiple hash functions, the IP address lookup method and hardware architecture capable of classifying prefixes based on the prefix lengths, constructing separate tables corresponding to the classified prefix lengths of the IP address, performing an IP address lookup process on the tables by using a multiple hashing process applying hash functions in parallel, and selecting entries having the longest-matched-prefix among the prefix-matched entries.

According to a first construction of the first aspect of the present invention, there is provided an IP address lookup method using a hash table, the hash table being constructed with an SRAM, the hash table including main tables and sub-tables corresponding to prefix lengths of the IP address, entries being stored in the main tables and the sub-tables, the method comprising steps of: (a) performing a hashing process on an incoming IP address based on the prefix lengths of the IP address by using a hashing hardware unit, wherein the hashing hardware unit is constructed based on the prefix lengths of the IP address; (b) comparing prefixes, each of which is stored at a location in the main table pointed by a hashing value with the prefix of the IP address, searching entries of the main table having the prefix matched with the prefix of the IP address, and forwarding information on prefix-matched entries; (c) if there is no prefix-matched entry as a result of Step (b), searching entries of the sub-table having the prefix matched with the prefix of the IP address starting from a location in the sub-table pointed by a pointer of the main table, and forwarding information on prefix-matched entries; and (d) searching an entry having the longest-matched-prefix among the prefix-matched entries by using the information forwarded in Steps (b) and (c).

According to a second construction of the first aspect of the present invention, there is provided an IP address lookup hardware architecture comprising: a hashing hardware unit for hashing a prefix of an incoming IP address; a main processor having a main table for storing entries based on prefix lengths of the IP address to form a hashing table, the main processor having functions of: comparing prefixes, each of which is stored at a location in the main table pointed by a hashing value with the prefix of the IP address; searching entries of the main table having the prefix matched with the prefix of the IP address: and forwarding information on prefix-matched entries; a sub-processor having a sub-table for storing entries based on prefix lengths of the IP address to form a hashing table, the sub-processor having functions of: searching entries of the sub-table having the prefix matched with the prefix of the IP address starting from a location in the sub-table pointed by a pointer of the main table; and forwarding information on prefix-matched entries; and a priority encoder for selecting an entry having the longest-matched-prefix among the prefix-matched entries by using the forwarded information on the prefix-matched entries.

According to a first construction of the second aspect of the present invention, there is provided an IP address lookup method using multiple hash functions, the method comprising steps of: (a) performing at least one hashing process on an incoming IP address based on prefix lengths of the IP address; (b) comparing prefixes, each of which is stored at a location in a forwarding table pointed by a hashing value with the prefix of the IP address; (c) comparing prefixes, each of which is stored in an overflow table with the prefix of the IP address; (d) if the prefix compared in Step (b) or (c) matches with the prefix of the IP address, forwarding information on the prefix-matched entries; and (e) searching an entry having the longest-matched-prefix among the prefix-matched entries by using the information forwarded in Step (d).

According to a second construction of the second aspect of the present invention, there is provided an IP address lookup hardware architecture using multiple hash functions, the method comprising steps of: a hashing hardware unit for performing a hashing process on an incoming IP address; a main processor having an overflow table and at least one forwarding table storing entries in a form of a hashing table based on prefix lengths of the IP address, the main processor having functions of: comparing prefixes, each of which is stored at a location in a forwarding table pointed by a hashing value with the prefix of the IP address; comparing prefixes, each of which is stored in an overflow table with the prefix of the IP address; and forwarding information on the prefix-matched entries; and a priority encoder for selecting an entry having longest-matched-prefix among the prefix-matched entries by using the forwarded information on the prefix-matched entries.

According to a third construction of the second aspect of the present invention, there is provided a method of generating a forwarding table used for IP address lookup, the method comprising steps of: (a) performing at least one hashing process based on the length of the prefix; (b) storing the prefix in a bucket having the lowest load among buckets pointed by hashing values; and (c) if there is no storage space in the forwarding table, storing the prefixes in buckets of an overflow table.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
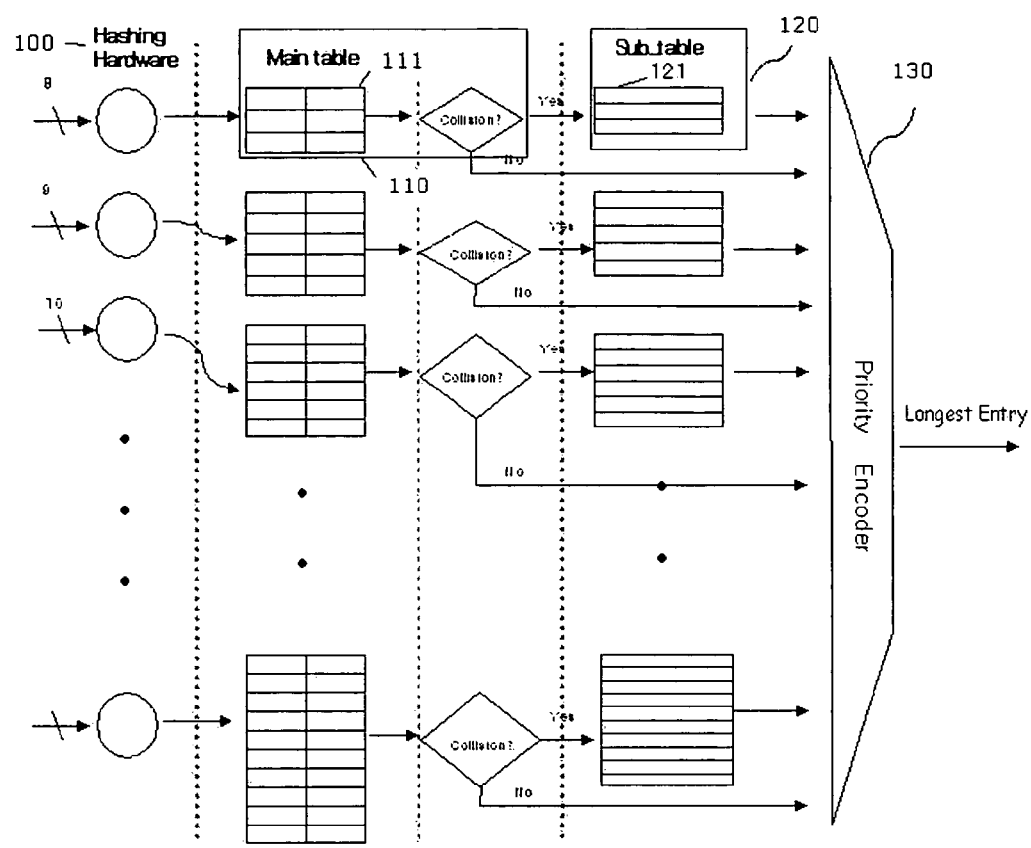
FIG. 1 is a block diagram showing an IP address lookup hardware architecture according to an embodiment of a first aspect of the present invention.

The present invention and operational advantages thereof can be fully understood by referring to the accompanying drawings and explanations thereof.

Now, exemplary embodiments of the present invention will be described with reference to the accompanying drawings to explain the present invention in detail. In the drawings, the same reference numerals indicate the same elements.

[First Aspect of the Present Invention]

FIG. 1 is a block diagram showing an IP address lookup hardware architecture according to a first aspect of the present invention.

The IP address lookup hardware architecture comprises a hashing hardware unit 100, a main processor 110, a sub-processor 120, and a priority encoder 130.

The hashing hardware unit 100 has a function of performing a hashing process on a prefix of an incoming address. The hashing process is a process of mapping an input prefix value into a shorter prefix value by using a hash function. As a result of the hashing process, several different input prefix values may be mapped into the same output hashing value. That is called a "collision." In the IP address lookup hardware architecture using the hashing process, it is important to minimize the collisions. A good hash function provides uniform output hashing values. If the IP address lookup is performed by using the hashing process, the prefixes can be efficiently stored in the forwarding table. In addition, since the prefix-matched entries can be searched at one time, performance of the IP address lookup increases. However, an important issue is how to minimize the collisions. In the embodiment of the first aspect of the present invention, bits of the prefixes are grouped in units of a predetermined bit to provide a required hashing value, and the hashing hardware unit 100 performs an exclusive OR operation on the bit groups of the prefix.

The main processor 110 comprises a main table 111 where entries are stored based on prefix lengths of the IP address in form of a hashing table. The main processor 110 compares a prefix stored at a location of the main table 111 pointed by a hashing value output from the hashing hardware unit 110 with the prefix of the IP address in order to find out the prefix matched with the prefix of the incoming IP address.

The sub-processor 120 comprises a sub-table 121 where entries are stored based on prefix lengths of the IP address in form of a hashing table. The sub-processor 120 searches entries of the sub-table 121 having the prefix matched with the prefix of the IP address starting from a location in the sub-table 121 pointed by a pointer of the main table 111.

After all the tables with respect to an IP address are completely searched, the priority encoder 130 selects an entry having the longest-matched-prefix among the prefix-matched entries searched in each of the prefix lengths of the IP address.

As shown in FIG. 1, the hashing hardware unit 110, the main tables 111, and the sub-tables 121 are constructed based on the prefix lengths of the IP address. The output values of the different hashing hardware units 100 corresponding to the prefix lengths points a single entry of the main table 111. Main table 111 provides pointer information to point the sub-tables 121. The main table 111 and the sub-table 121 may be constructed with a single SRAM. Separate IP address lookup tables are constructed based on the prefix lengths. The IP address lookup is performed in the tables stored in the SRAM in parallel. An algorithm used for the aforementioned IP address lookup method is as follows.

[Algorithm]

---

Function Search_Prefix /* search for address D */
Do parallel (L = 8 ~ 32)
   Extracts the first L bits of D into D';
   Table_pointer = Hash(D'); /* Hash(D') performs Exclusive-OR operation and the result is used as a table pointer */
   Compare D' and an entry value pointed by Table_pointer;
   if (not same) begin /* a collision occurs*/
     use pointer to the Sub_table and # of entries to be searched and perform Binary search for the entries;
   end
   Send Search_result and ACK to the Priority Encoder;
End Do parallel

---

Select the entry with longest prefix

In the algorithm according to the embodiment of the present invention, an incoming IP packet has a prefix length range of 8 to 32. However, the prefix length range may change.

The algorithm will be described with reference to a flowchart of FIG. 2.

Figure 2:
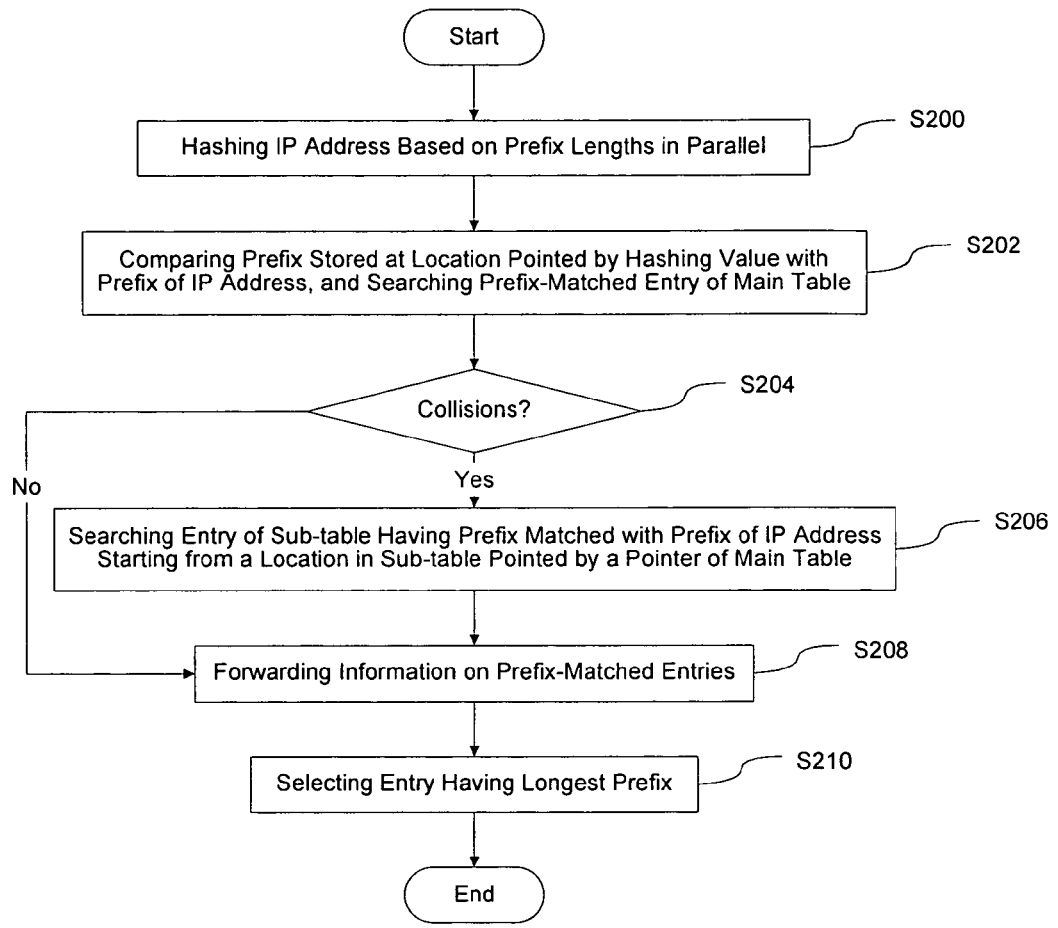
FIG. 2 is a flowchart showing an IP address lookup method according to the embodiment of the first aspect of the present invention.

FIG. 2 is a flowchart showing an IP address lookup method according to the embodiment of the first aspect of the present invention Firstly, a hashing process is performed in parallel on the SRAM corresponding to the prefix lengths of the IP address by a hashing hardware unit 110 (S200). The hashing hardware unit 110 is constructed based on the prefix length of the IP address. The hashing hardware unit 110 performs an exclusive OR operation on bit groups of the prefix. Here, the bit groups are obtained by grouping the bits of the prefix in units of a predetermined length to provide a required hashing value. If the bits of the prefix are not completely grouped to provide the required hashing value, empty bit locations of the incomplete bit group are filled with arbitrary bits. The arbitrary bits are filled from the rear location in a manner of "1010 . . . ". For example, in case of a prefix with length 8, since the result of hashing is of 2 bits, the hashing value is calculated as follows.

$$\text{Hashing\_Value (for a prefix with length 8)} = [7{:}6] \hat{} [5{:}4] \hat{} [3{:}2] \hat{} [1{:}0]$$

In case of a prefix with length 14, since the result of hashing is of 6 bits, the hashing value is calculated as follows.

$$\text{Hashing\_Value (for a prefix with length 14)} = [13{:}8] \hat{} \{[7{:}2] \hat{} [1{:}0], 0, 1, 0, 1\}$$

Next, a prefix stored at a location in the main table 110 pointed by the hashing value obtained in the step S200 is compared with the prefix of the IP address, and a process of searching an entry having a prefix matched with the prefix of the IP address is performed (S202).

Next, it is determined whether or not there is a matched prefix (S204). Next, in a case where there is no matched prefix, that is, a case of the collisions occurring, a process of searching an entry of the sub-table 121 having the prefix matched with the prefix of the IP address starting from a location in the sub-table 121 pointed by a pointer of the main table 111 (S206). Here, the pointers pointing the sub-table 121 stored in the entries of the main table 111 and information on the number of collisions corresponding to the entries is used for the searching. In the embodiment of the first aspect of the present invention, a binary searching scheme is used to search the entries corresponding to the collisions from the location in the sub-table 121 pointed by the pointer of the main table 111. In case of the collisions not occurring, since there is a prefix matched with the prefix of the IP address in the main table 111, the sub-table needs not to be searched.

Information on the prefix-matched entries in the main table 111 searched in case of the collisions not occurring or information on the prefix-matched entries in the sub-table 121 searched in case of the collisions occurring is forwarded to a priority encoder (S208). The forwarded information includes next-hop addresses and output ports.

The aforementioned steps S202 to S208 are performed in parallel for each SRAM based on the predetermined prefix lengths. Therefore, after the step S208 ends, the prefix-matched entries are obtained corresponding to the prefix lengths of the IP address. After all the tables with respect to an IP address are completely searched, the priority encoder selects an entry having the longest prefix (S210). That is, the prefix of the entry having the longest-matched-prefix among the prefix-matched entries searched in each of the prefix lengths of the IP address is determined to be a best matching prefix (BMP), and information on the next hop address and the output port corresponding to the entry is used for packet forwarding.

Figure 3:
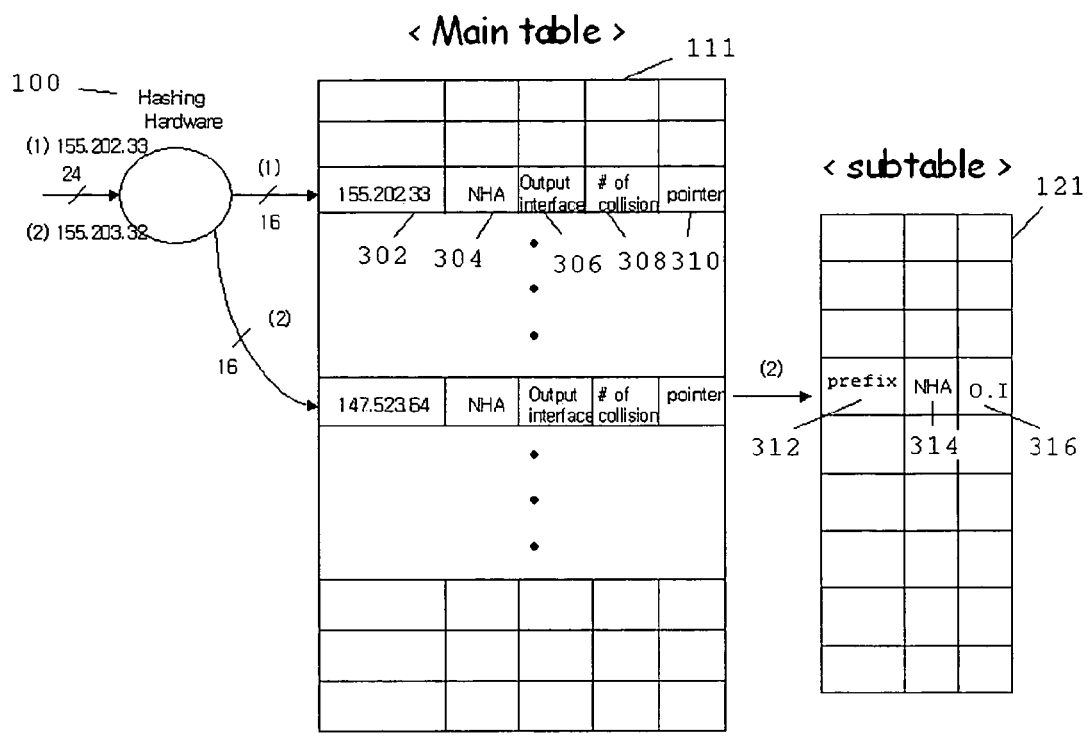
FIG. 3 is a view showing hashing tables constructed with SRAMs according to the embodiment of the first aspect of the present invention.

FIG. 3 is a view showing hashing tables constructed with SRAMs according to the embodiment of the first aspect of the present invention;

In FIG. 3, the input prefix length is of 24 bits. The architecture shown in FIG. 3 comprises a hashing hardware unit 100 having a hash function, a main table 111 and a sub-table 121. The hash function has a hashing value of 16 bits.

In the embodiment of the first aspect of the present invention, the entries of the main table 111 include a prefix field 302 used for comparison, a next hop address field 304, an output port field 306, a collision number field 308 corresponding to the hashing entries, and a pointer field 310 pointing the sub-table 121. The entries of the sub-table 121 include a prefix field 312, a next hop address field 314, and an output port field 316.

Case (1) shown in FIG. 3 corresponds to a searching process in the main table 111. In Case (1), information stored in the next hop address field 304 and the output port field 306, which are stored in the entries, are forwarded to the priority encoder. On the other hand, in Case (2) shown in FIG. 3, the prefix stored at a location pointed by the hashing value is not the prefix of the incoming IP address but a prefix of the other IP addresses. That is, Case (2) corresponds to a case of the collisions occurring. In Case (2), information stored in the pointer field 308 pointing the sub-table 121 and the collision number field 310 corresponding to the hashing entries among the information stored in the entries are used for the IP address lookup process. In the embodiment of the first aspect of the present invention, a binary searching process is performed on the entries corresponding to the collisions from the location of the sub-table 121 pointed by the pointer field 308.

Although not shown in FIGS. 1 and 3, a separate forwarding RAM may be provided to store information on the next hop address and the output port. In case of using the separate forwarding RAM, the next hop address field 304 and the output port field 306 out of entries of the main tables 111 and the sub-tables 121 can be replaced with a pointer field pointing the forwarding RAM. In this case, the aforementioned algorithm is slightly modified. That is, the information forwarded in the step S210 is not the information on the next hop address and the output port but information on a pointer pointing the forwarding RAM. When an entry having the longest prefix is found in the step S216, the priority encoder 130 does not have the information on the next hop address and the output port, and thus, the forwarding RAM provides the information on the next hop address and the output port.

All the above processes are performed in parallel with the corresponding SRAMs based on the prefix lengths. After all the tables with respect to an IP address are completely searched, the priority encoder 130 selects an entry having the longest-matched-prefix among the prefix-matched entries searched in each of the prefix lengths of the IP address. The information on the next hop address and the output port of the entry is used for packet forwarding.

Now, performance of the IP address lookup method and hardware unit according to the embodiment of the first aspect of the present invention will be described.

The IP address lookup hardware architecture according to the embodiment of the first aspect of the present invention requires the smallest memory size expect for the forwarding searching structure as shown in the later-described Table 2. In the embodiment of the first aspect of the present invention, there is a shortcoming in that the IP address lookup hardware architecture utilizes separate SRAMs for the corresponding prefix lengths so that the associated overheads have to be considered. However, the hashing process using the exclusive OR operations can be obtained in a small overhead of hardware implementation. In addition, the average number of memory accesses is 1.93. Therefore, it can be understood that the IP address lookup hardware architecture according to the present invention has as much as performance as the conventional one using a hardware unit having a large memory.

Figure 4:
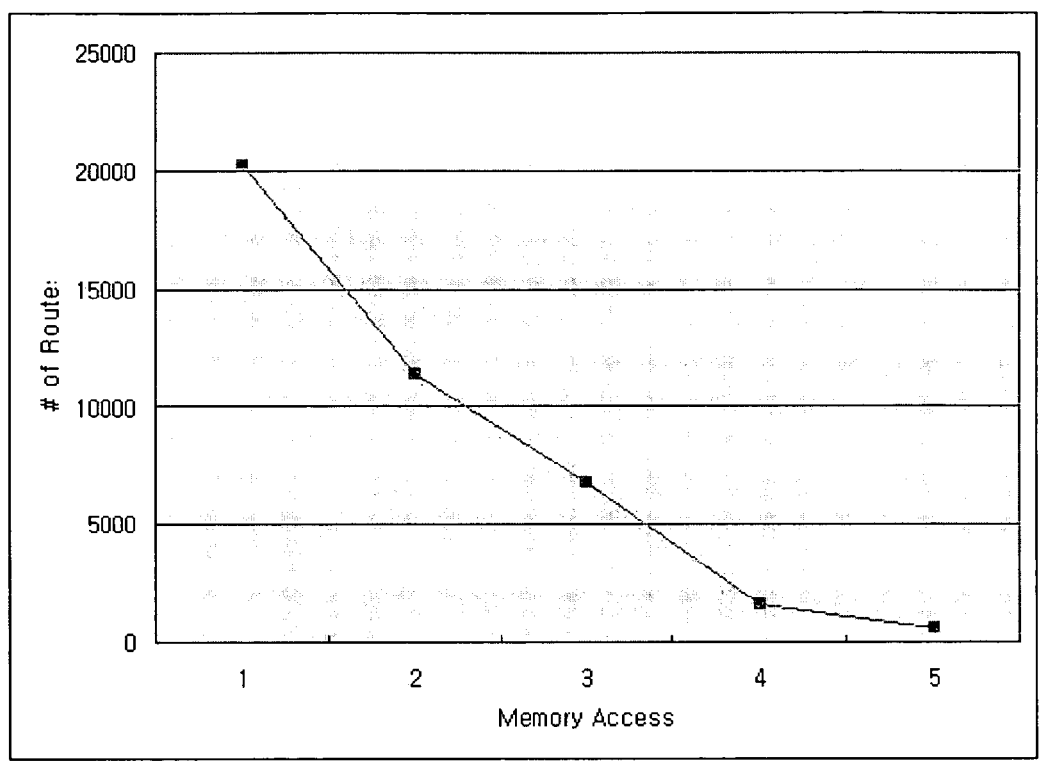
FIG. 4 is a graph showing a memory access distribution in the IP address lookup hardware architecture according to the embodiment of the first aspect of the present invention.

FIG. 4 is a graph showing a memory access distribution in the IP address lookup hardware architecture according to the embodiment of the first aspect of the present invention.

As shown in FIG. 4, 78% or more routes can be searched by two times of memory accesses, and 95% or more routes can be searched by three times of memory accesses.

Referring to the later-described Table 2, in the IP address lookup hardware architecture according to the embodiment of the first aspect of the present invention, the maximum number of memory accesses is 5, which is a case that a large number of collisions occur since the main table 111 has a relatively small size. The maximum number of memory accesses can be adjusted by allocating the more memory size to the main table 111. In addition, the associated IP address lookup throughput can be improved by using a hardware pipelining method. For example, the main table 111 and the sub-table 121 are separately implemented with the corresponding SRAMs, and the IP address lookup processes in the main table 111 and the sub-table 121 are performed in parallel on the consecutive stream of incoming packets.

[Second Aspect of the Present Invention]

Now, preferred embodiments of the second aspect of the present invention will be described with reference to the accompanying drawings.

First Embodiment of Second Aspect

In a first embodiment of the second aspect of the present invention, a parallel searching scheme is combined with an IP address lookup hardware architecture based on data analysis.

Figure 5:
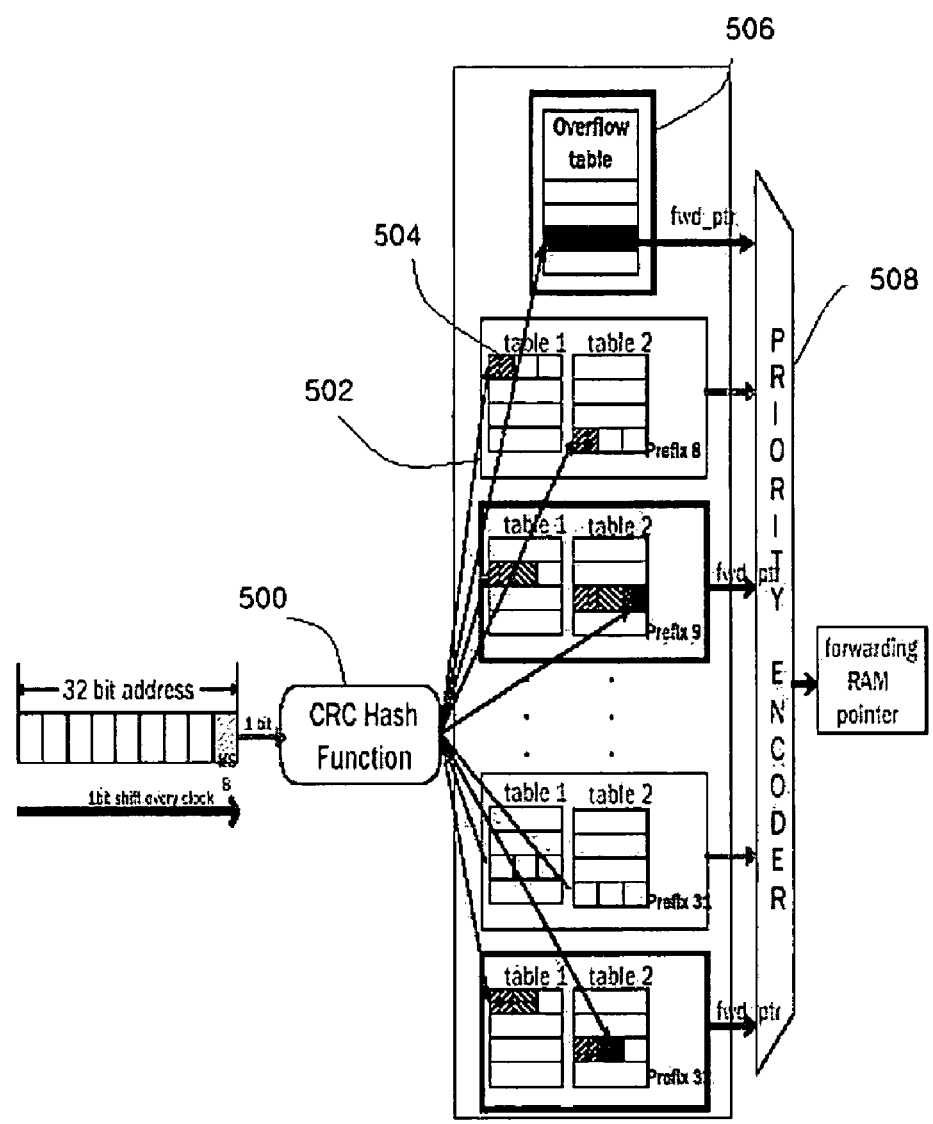
FIG. 5 is a block diagram showing an IP address lookup hardware architecture according to a first embodiment of a second aspect of the present invention.

FIG. 5 is a block diagram showing an IP address lookup hardware architecture according to the first embodiment of the second aspect of the present invention.

The IP address lookup hardware architecture according to the first embodiment comprises a hashing hardware unit 500, a main processor 502, and a priority encoder 508.

The hashing hardware unit 500 has a function of performing a hashing process on a prefix of an incoming address. In particular, according the first embodiment of the second aspect of the present invention, the hashing hardware unit 500 is a CRC hashing hardware unit using a fixed CRC hash function to facilitate hardware implementation and forwarding table updating. The scheme for obtaining a hashing value from the CRC hashing hardware unit will be described in detail later.

The main processor 502 according to the first embodiment has an overflow table 506 and at least one forwarding table 504 storing entries in a form of a hashing table based on prefix lengths of the IP address. The main processor 502 compares prefixes, each of which is stored at a location in a forwarding table 504 pointed by a hashing value output from the hashing hardware unit 500, with the prefix of the incoming IP address, compares prefixes, each of which is stored in an overflow table 506, with the prefix of the incoming IP address, and sends the forwarding information on prefix-matched entries to the priority encoder.

In the first embodiment, after all the tables with respect to an IP address are completely searched, the priority encoder 508 selects an entry having the largest bit number of prefix, that is, the prefix of the entry having the longest-matched-prefix among the prefix-matched entries searched in each of the prefix lengths of the IP address.

In the IP address lookup scheme according to the first embodiment of the second aspect of the present invention, two forwarding tables 504 and two hash functions are provided to correspond to the prefix lengths. The IP address lookup processes are performed in parallel on all the prefixes.

In a conventional scheme, the prefix lengths are not so fixed that a plurality of entries may be stored in a forwarding table. Since an entry having the longest prefix has to be searched among the large number of entries, the longest prefix matching scheme is difficult. Therefore, in the conventional scheme, there is a problem in that the number of memory accesses increases due to the non-fixed prefix lengths. In the first embodiment of the second aspect of the present invention, in order to solve the problem of the conventional scheme, the tables are separately constructed corresponding to the prefix lengths and the prefixes are stored in different tables. Therefore, it is possible to perform the searching processes on all the prefix lengths in parallel. In other words, separate forwarding tables are provided corresponding to the prefix lengths. For example, (kinds of prefix lengths)×2 of tables are provided. In this manner, the longest prefix matching problem is converted into the so-called exact matching problem. In the first embodiment of the second aspect of the present invention, each of the main tables 502 constructed corresponding to each of the prefix lengths searches a single entry having a matched prefix for the associated prefix length, and next, the longest entry among the entries searched in parallel by the main tables is determined to be the matched entry.

In addition, the first embodiment of the second aspect of the present invention, a single hashing hardware unit 500 is used to obtain hashing values for all the prefixes by using a time sharing scheme. In the conventional scheme, a suitable hash function is determined based on a data distribution in a software manner using CPU. In the first embodiment of the present invention, a fixed hash function is used, so that it is possible to easily implement and update a hardware unit. In addition, it is possible to increase the speed of the IP address lookup.

Figure 6:
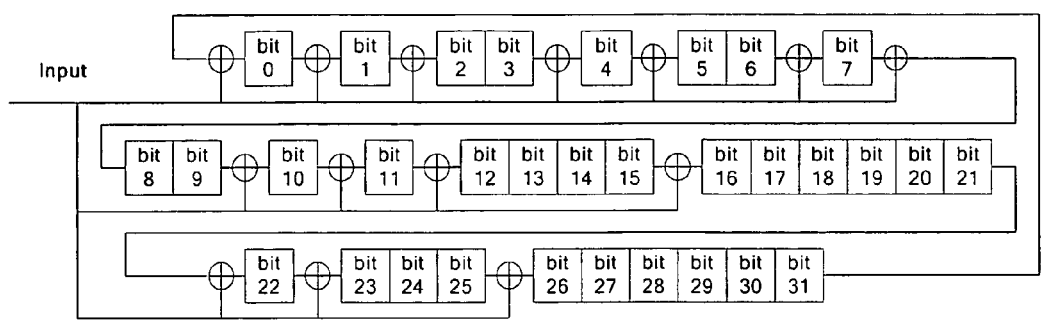
FIG. 6 is a schematic diagram showing a CRC hashing hardware unit for calculating a plurality of hashing values according to the first embodiment of the second aspect of the present invention.

FIG. 6 is a schematic diagram showing the CRC hashing hardware unit 500 for calculating a plurality of hashing values according to the first embodiment of the second aspect of the present invention. Since the CRC is estimated to have a substantially perfect hashing performance, the CRC hashing hardware unit 500 is used to minimize the collisions. In addition, all the hashing values used for the forwarding tables 504 are obtained by a single hashing hardware unit 500. Since additional hashing hardware units for each of the prefixes are not required, it is possible to reduce the overhead of the parallel-processing architecture.

In the first embodiment of the second aspect of the present invention, the hashing values are obtained by the CRC hashing hardware unit 500 as follows. Firstly, bits of a destination IP address are entered bit-by-bit into the CRC hashing hardware unit 500. After D cycles from the time that the destination IP address is entered into the CRC hashing hardware unit 500, two specified hashing values are extracted from CRC registers. The extracted hashing values are used for the prefix D. The hashing values are obtained for different prefix lengths are taken at different timings from the same hashing hardware unit 500. For example, first 8 bits of the IP address are entered in to the CRC hashing hardware unit 500. Two hashing values for the prefix length 8 are extracted from the CRC registers. After one cycle, 9 bits of the IP address is entered, so that two hashing values are extracted for the prefix length 9. Therefore, all the hashing values for 32 different lengths can be obtained after 32 cycles. Here, since the hashing values become hashing indices, the hashing length of the table where the prefix are stored can be determined based on the number of stored entries.

Figure 7:
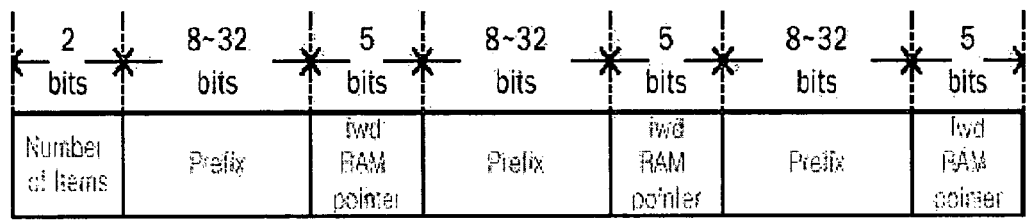
FIG. 7 is a view showing a bucket structure of a forwarding table 504 having a plurality of entries according to the first embodiment of the second aspect of the present invention.

FIG. 7 is a view showing a bucket structure of a forwarding table 504 having a plurality of entries according to the first embodiment of the second aspect of the present invention.

In the first embodiment of the second aspect of the present invention, a data analysis is performed in order to determine the number of entries per bucket in each of the forwarding tables 504. As a result of the analysis, it is observed that, when N prefixes (items) are hashed into N/2 buckets using two hash functions, the probability that three or more collision occur in each table is $1.5e^{-50}$, which is very low. Now, an entry structure according to the first embodiment of the second aspect of the present invention will be described based on the analysis. In this case, it is assumed that two hash functions and 6 loads per bucket are provided to each of the prefix lengths.

As shown in FIG. 7, each of the entries of the forwarding table 504 has three loads. Therefore, each of the entries comprises an item number field indicating the number of loads, three prefix fields, and three forwarding RAM pointer fields.

The following Algorithm 1 is an algorithm for generating the forwarding table 504 according to the first embodiment of the second aspect of the present invention.

[Algorithm 1]

```
For prefix length L, P[L-1:0]
P[L-1:0] serially entered to CRC hash function
Extract H₁(L), H₂(L) from CRC registers after L cycles
Do
    table1_ptr = H₁(L)
    table2_ptr = H₂(L)
    If(((# of load (table1_ptr)) == ((# of load (table2_ptr)) == 3)
        Then put P[L-1:0] to overflow table
    Else if(((# of load (table1_ptr)) > ((# of load (table2_ptr)))
        Then put P[L-1:0] to table2
    Else put P[L-1:0] to table1
End Do
```

A process for generating the forwarding tables 504 based on Algorithm 1 according to the first embodiment of the second aspect will be described with reference to FIG. 8.

Figure 8:
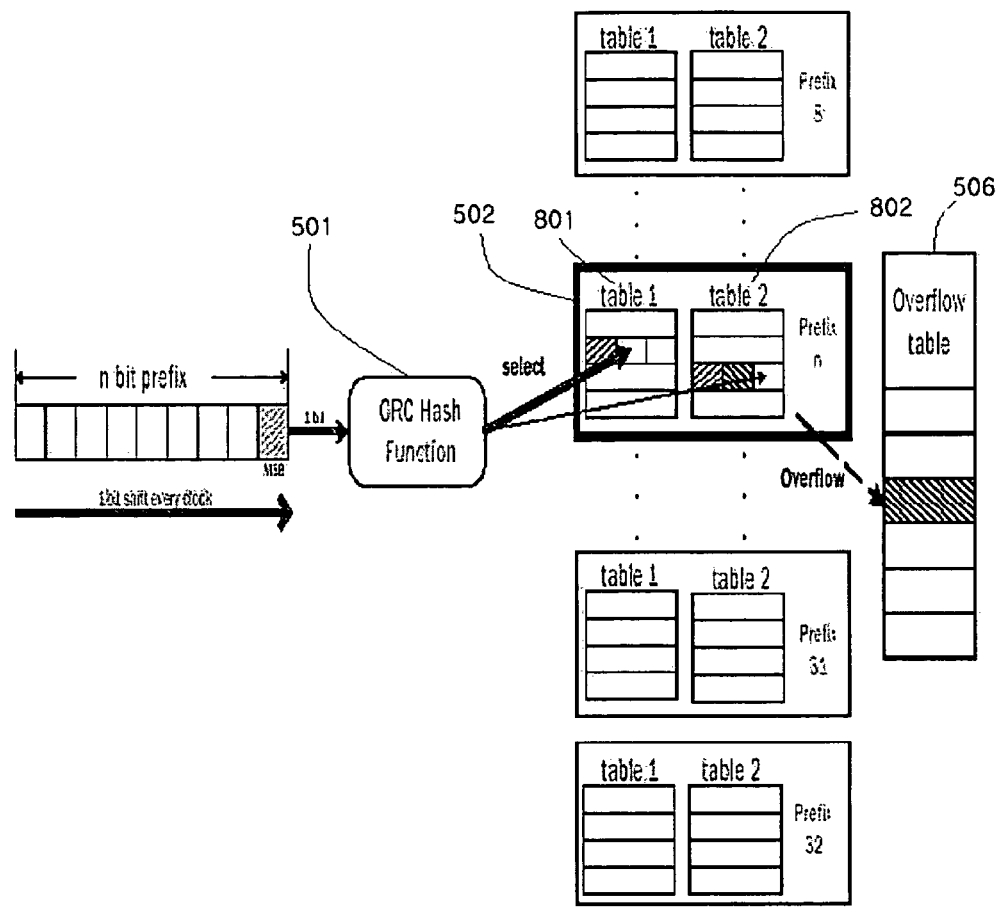
FIG. 8 is a view showing a process for generating a plurality of the forwarding tables 504 according to the first embodiment of the second aspect of the present invention.

FIG. 8 is a view showing a process for generating a plurality of the forwarding tables 504 according to the second aspect of the present invention.

Firstly, a destination IP address is input bit-by-bit to the CRC hashing hardware unit 500 to be subjected to the hashing process. Next, in L (prefix length) cycles, hashing values are output from a CRC register. The prefix is stored in a smaller-load bucket out of two buckets pointed by two hashing values. In a case where the two buckets has the same load, the prefix is stored in the prefix table 1 (801). n a case where the two prefix tables 1 and 2 (801, 802) is full, overflow occurs. In this case, the prefix is stored in a separate overflow table 506. In the first embodiment, two main tables 801 and 802 are provided in each of the prefix lengths, so that 50 main tables 801 and 802 and one overflow table 506 are needed.

The following Algorithm 2 is an algorithm for an IP address lookup process according to the first embodiment of the second aspect of the present invention.

[Algorithm 2]

```
At cycle L (for L = 8 ~ 32), let D[31:31-L+1] is L bits of
destination address D.
D[31:31-L+1] serially entered to CRC hash function
Extract H₁(L), H₂(L) from CRC registers
```

-continued

```
Do Parallel (L = 8 ~ 32)
    table1_ptr = H₁(L)
    table2_ptr = H₂(L)
    If(D[31:31-L+1] = prefix(table1_ptr))
        Then fwd_ptr = fwd_ptr(table1_ptr)
    Else if(D[31:31-L+1] = prefix(table2_ptr))
        Then fwd_ptr = fwd_ptr(table2_ptr)
End Do Parallel
```

Search from overflow CAM
Determine LPM among matching entries

Figure 9:
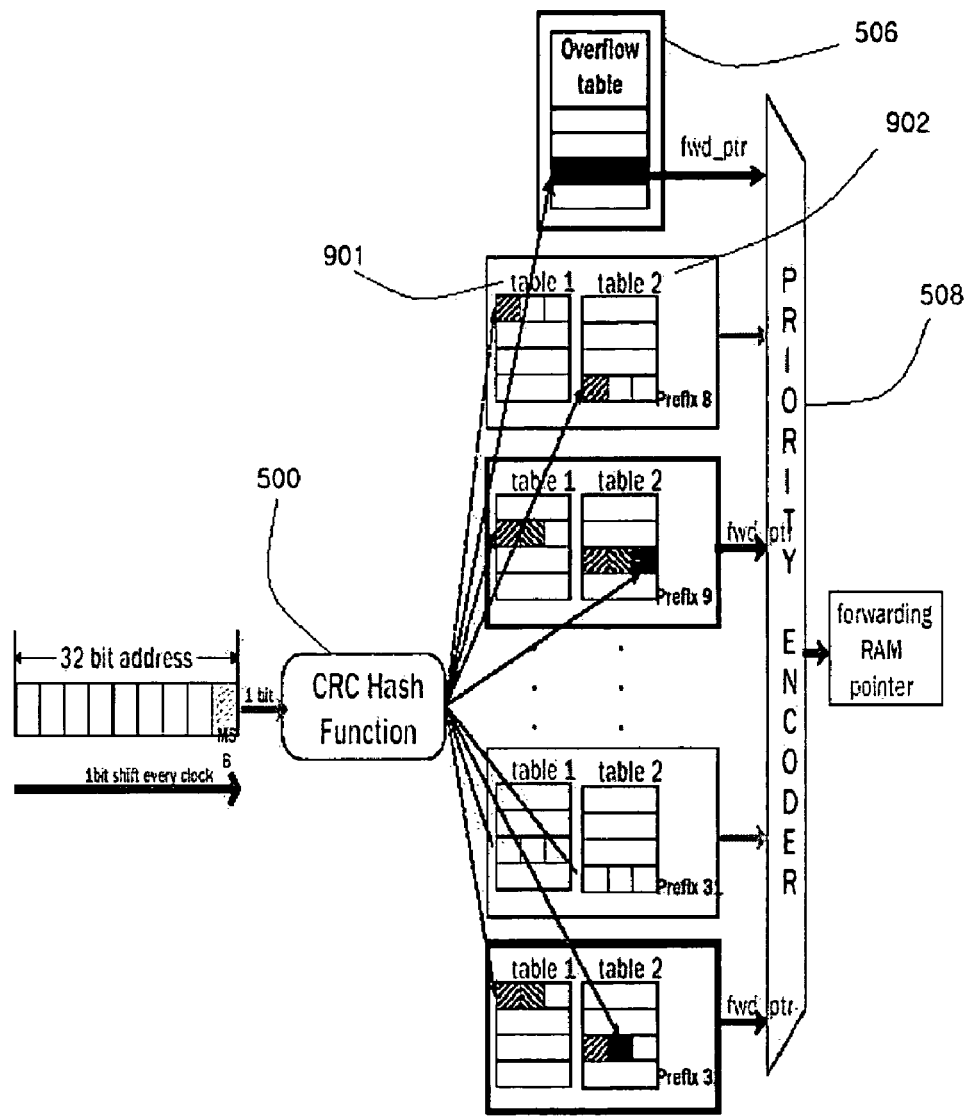
FIG. 9 is a block diagram showing an IP address lookup hardware process according to the first embodiment of the second aspect of the present invention.

Now, the IP address lookup process according to the first embodiment of the second aspect of the present invention will be described with reference to Algorithm 2 and FIG. 9.

The IP address lookup process is performed in parallel by using the hashing values obtained by the CRC hashing hardware unit 500. The hashing values are obtained with a scheme similar to the scheme used to construct the forwarding tables 504. The difference between the two is that, the hashing values in the IP address lookup process are extracted with respect to all the prefix lengths and the hashing value in the construction process of forwarding table is extracted with respect to a single prefix length.

As shown in Algorithm 2, the incoming address is hashed based on the prefix lengths. Each of the forwarding tables 901 and 902 for each of the prefix are searched in parallel by using the hashing values as indices. At the same time, the overflow table 506 is searched. As a result of the searching processes, if the prefix is matched with the prefix of the incoming IP address, information on the prefix-matched entries are forwarded to the priority encoder 508. Each of the prefix-matched entries includes a pointer pointing the forwarding RAM. The priority encoder 508 selects an entry having largest prefix bit numbers among the searched entries, and transmits a packet to an output port by using the information on the forwarding RAM pointer.

As descried in Algorithm 1 for generating the forwarding tables 901 and 902, if the forwarding tables are so full that there is no space for storing newly added prefixes, the newly added prefixes are stored in a separate overflow table 506. The overflow table 506 may be implemented with a content addressable memory (CAM). By using the CAM, it is possible to search the prefix-matched entry at one time.

According to the first embodiment of the second aspect of the present invention, it is possible to easily update the forwarding table. The updating process is the same as the aforementioned process for generating the forwarding tables. That is, to-be-stored prefixes are stored in buckets having a lower loads among the buckets indicated by hashing values. In a case where, there is an overflow in a forwarding table, the associated prefixes are stored in the overflow table. In such a manner, since much pre-processing is not required, it is possible to rapidly update the forwarding tables. In addition, the expansion to IPv6 can be made by simply increasing the number of forwarding tables.

Second Embodiment of Second Aspect

Now, an IP address lookup method and hardware architecture according to a second embodiment of the second aspect of the present invention will be described with reference to FIG. 10.

Figure 10:
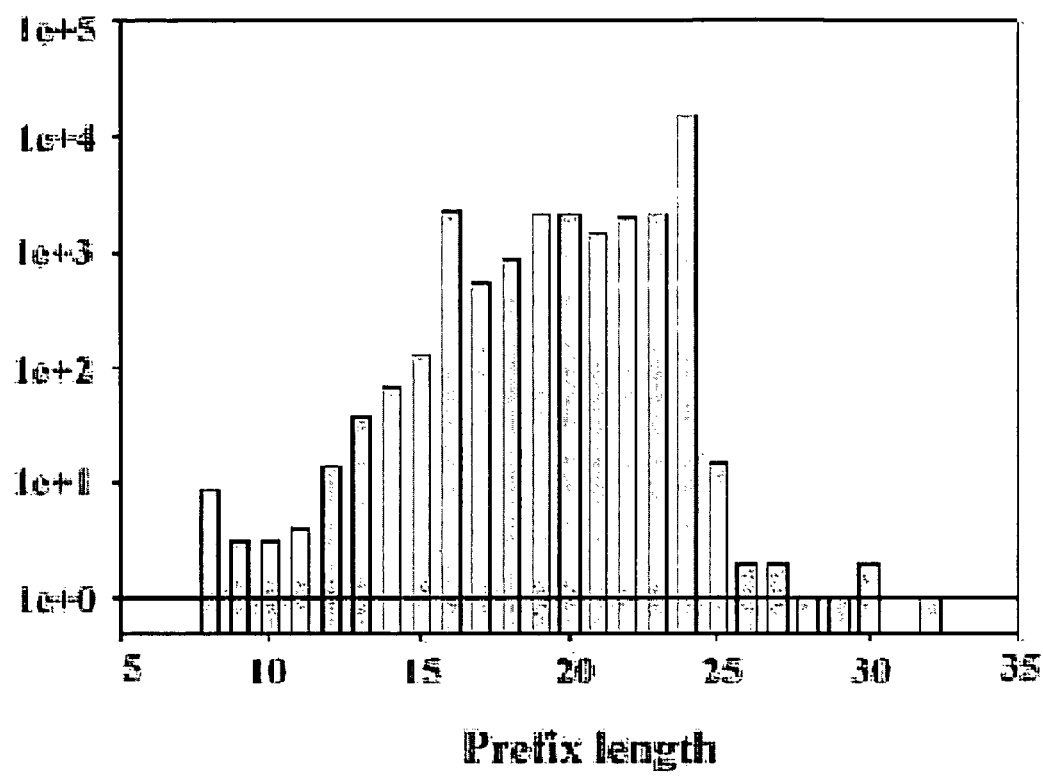
FIG. 10 is a graph showing a route distribution with respect to prefix lengths in the IP address lookup hardware architecture according to a second embodiment of the second aspect of the present invention.

FIG. 10 is a graph showing a route distribution with respect to prefix lengths in the IP address lookup hardware architecture according to the second embodiment of the second aspect of the present invention.

In the second embodiment of the second aspect of the present invention, a simulation is performed to implement the IP address lookup hardware architecture by using real data of the prefixes passing through a MAE-WEST router. In FIG. 10, a distribution of the prefixes passing through the MAE-WEST router is shown. In order to test an entry efficiency and overflow rate obtained by the simulation, test cases with respect to items, buckets, and hash functions are selected based on the prefix distribution of the MAE-WEST router. Here, the entry efficiency means a ratio of entries storing prefixes to all the table entries.

The following Table 1 shows the entry efficiency and overflow rate obtained by the simulation, which is performed as the numbers of items, buckets, and hash functions change.

TABLE 1

| case | Item Number | Bucket Number | Hash Function Number | Entries/ bucket | Memory Size | Entry Efficiency | Overflow Rate |
|---|---|---|---|---|---|---|---|
| 1 | N | N/2 | 1 | 4 | 203 KB | 49.85% | 3.4% |
| 2 | N | N/2 | 2 | 4 | 203 KB | 49.85% | 0.52% |
| 3 | N | N/2 | 2 | 6 | 303 KB | 33.41% | 0% |
| 4 | N | N/4 | 3 | 6 | 152 KB | 66.3% | 0.46% |

In Case 1, a single hash function is used. Therefore, total 25 tables are used. As shown in Table 1, when N items are stored in N/2 buckets, each of which has 4 loads, and about 200 Kbytes of memory size is required. As a result, the overflow rate of 3.4% occurs.

In Case 2, two hash functions are used, and the other conditions are the same as Case 1. As shown in Table 1, since the overflow rate is about 0.5%, it can be understood that the overflow rate remarkably reduces. Since two hash functions are used, the prefixes in Case 2 are evenly distributed over the associated two tables in comparison to Case 1 using the single hash function, so that the overflow rate can reduce.

In Case 3, two hash functions and 3 entries per bucket are used, and the memory size increases by about 30% of Cases 1 and 2 in order to completely remove the overflow.

In Case 4, N items are stored in N/4 buckets, each of which has 6 loads, and three hash functions are used. As shown in Table 1, Case 4 has the highest memory efficiency among the Cases. Case 4 requires 152 Kbytes of memory size. 136 overflows occur.

According to the comparison of the four cases, it can be understood that, the more hash functions are used, the more rapidly the overflows due to the collisions reduces. In addition, it can be understood that there is a trade-off between the memory efficiency and the memory overflow rate.

Referring to Table 1, it can be understood that the overflow rates are very small. Therefore, the overflow table 306 can be implemented with the content addressable memory, which has a small number of entries.

The following Table 2 shows performances of the IP address lookup architectures of the first and second aspects of the present invention and the conventional architectures.

TABLE 2

| Address Lookup Scheme | Number of Memory Accesses (Minimum, Maximum) | Forwarding Table Size |
|---|---|---|
| Huang's scheme | 1, 3 | 450 KB~470 KB |
| DIR-24-8 | 1, 2 | 33 MB |
| DIR-21-3-8 | 1, 3 | 9 MB |
| SFT | 2, 9 | 150 KB~160 KB |
| First Aspect of Present Invention | 1, 5 | 189 KB |
| Second Aspect of Present Invention | 1, 1 | 203 KB + CAM with 154 entries |

As shown in Table 2, it can be understood that the IP address lookup architectures according to the present invention has an excellent performance in the required memory size as well as the memory access times compared with the conventional ones.

According to the present invention, since prefixes are classified based on their own prefix lengths and separate tables are allocated to the prefix lengths, it is possible to perform a parallel searching process on all the prefixes based on the prefix lengths. As a result, it is possible to easily apply a hashing process to the IP address and to reduce searching time.

According to the first aspect of the present invention, it is possible to obtain memory access times of 1.93 in average, 1 in minimum, and 5 in maximum by using about 189 Kbytes of memory size.

According to the second aspect of the present invention, since all the prefixes can be searched at one time by using multiple hash functions, it is possible to obtain a performance similar to the so-called perfect hashing. According to the embodiment of the second aspect of the present invention, it is possible to store all the prefixes by using only 300 Kbytes of memory size without overflows. In addition, even in a case where 150 Kbytes of memory size is used, it is possible to efficiently utilize memory by storing 99.5% of the prefixes in the memory and constructing a separate overflow table for 0.5% of the prefixes. As a result, even though overflows occur, it is possible to perform the parallel searching the overflow table at the same time of searching forwarding tables without requiring an additional searching time.

According to the present invention, since several small-sized memories are used, it is possible to provide a high performance IP address lookup method and architecture capable of having a small storage space implemented with several small-sized memories and performing an IP address lookup process by using a small number of memory accesses. In addition, since address lookup tables corresponding to different prefix lengths of the IP address are implemented with different SRAMs, it is possible to easily update tables to add new entries and remove entries of the tables compared with a conventional one using a single memory. Moreover, it is possible to simply extend the architecture of the embodiment of the present invention into IPv6 architecture. In addition, due to its functional repeatability, the architecture according to the embodiment of the present invention can be easily implemented in a hardware manner.

While the present invention has been particularly shown and described with reference to exemplary embodiments thereof, it will be understood by those of ordinary skill in the art that various changes in form and details may be made therein without departing from the spirit and scope of the present invention as defined by the following claims.

The present application contains subject matter related to Korean patent applications no. 2003-33453 and no. 2003-77774, filed in the Korean Patent Office on Jan. 1, 2003, the entire contents of which being incorporated herein by reference."

What is claimed is:

1. An IP address lookup method comprising:
   (a) establishing a hashing table with an SRAM, the hashing table including a plurality of main tables and a plurality of sub-tables corresponding to prefix lengths of the IP address, entries being stored in the main tables and the sub-tables;
   (b) performing a hashing process on an incoming IP address based on the prefix lengths to generate a prefix of the incoming IP address that is shorter than the incoming IP address by using a hashing hardware unit, wherein the hashing hardware unit is constructed based on the prefix lengths of the IP address;
   (c) comparing prefixes, each of which is stored at a location in a main table pointed by a hashing value with the prefix of the incoming IP address, searching entries of the main table having a prefix matched with the prefix of the incoming IP address, and forwarding information on prefix-matched entries;
   (d) if there is no prefix-matched entry as a result of Step (c), searching entries of a sub-table having the prefix matched with the prefix of the incoming IP address starting from a location in the sub-table pointed by a pointer of the main table, and forwarding information on prefix-matched entries; and
   (e) selecting an entry having a longest-matched-prefix among the prefix-matched entries by using information forwarded in Steps (c) and (e).

2. The method according to claim 1, wherein the hashing hardware unit, the plurality of main tables, and the plurality sub-tables are constructed based on the prefix lengths of the IP address.

3. The method according to claim 1, wherein the plurality of main tables and the plurality of sub-tables are stored in a single SRAM based on the prefix lengths of the IP address.

4. The method according to claim 1, wherein the IP address lookup is performed based on the prefix lengths of the IP address in parallel.

5. The method according to claim 1, wherein the hashing hardware unit performs an exclusive OR operation in units of a predetermined bit number to obtain a desired hashing result.

6. The method according to claim 1, wherein the process of searching entries of the sub-table having the prefix matched with the prefix of the incoming IP address in Step (d) utilizes a binary search scheme.

7. The method according to claim 1, wherein the entries of the main table include a prefix used for the searching in step (d), a next-hop address, an output port, a pointer pointing the sub-table, and collision times corresponding to the entries of the main table, and wherein the entries of the sub-table include a prefix used for the searching, a next-hop address, and an output port.

8. The method according to claim 1, wherein the entries of the main table include a prefix used for the searching in step (d), a pointer pointing a forwarding RAM, a pointer pointing the sub-table, and collision times corresponding to the entries of the main table, and wherein the entries of the sub-table include a prefix used for the searching and a pointer pointing a forwarding RAM.

9. The method according to claim 8, wherein the forwarding RAM includes a next-hop address and an output port.

10. The method according to claim 1, wherein the main table and the sub-table are stored in a separate SRAM based on the prefix lengths of the IP address.

11. The method according to claim 1, wherein the information on the prefix-matched entries includes information on a next-hop address and an output port or information on a pointer pointing to a forwarding RAM.

12. An IP address lookup hardware architecture comprising:
    a hashing hardware unit for hashing an incoming IP address to generate a prefix of the incoming IP address that is shorter than the incoming IP address;
    a main processor having a main table for storing entries based on prefix lengths of the IP address to form a hashing table, the main processor having functions of: comparing prefixes, each of which is stored at a location in the main table pointed by a hashing value with the prefix of the incoming IP address; searching entries of the main table having the prefix matched with the prefix of the incoming IP address; and forwarding information on prefix-matched entries;
    a sub-processor having a sub-table for storing entries based on prefix lengths of the IP address to form a hashing table, the sub-processor having functions of: searching entries of the sub-table having the prefix matched with the prefix of the incoming IP address starting from a location in the sub-table pointed by a pointer of the main table; and forwarding information on prefix-matched entries; and
    a priority encoder for selecting an entry having a longest-matched-prefix among the prefix-matched entries by using the forwarded information on the prefix-matched entries.

13. The hardware architecture according to claim 12, wherein the hashing hardware unit, the main table, and the sub-table are constructed based on the prefix lengths of the IP address.

14. The hardware architecture according to claim 12, wherein the main table and the sub-table are stored in a single SRAM based on the prefix lengths of the IP address.

15. The hardware architecture according to claim 12, wherein the IP address lookup is performed based on the prefix lengths of the IP address in parallel.

16. The hardware architecture according to claim 12, wherein the hashing hardware unit performs an exclusive OR operation in units of a predetermined bit number to obtain a desired hashing result.

17. The hardware architecture according to claim 12, wherein the process of searching entries of the sub-table having the prefix matched with the prefix of the IP address utilizes a binary search scheme.

18. The hardware architecture according to claim 12, wherein the entries of the main table include a prefix used for the searching, a next-hop address, an output port, a pointer pointing the sub-table, and collision times corresponding to the entries, and wherein the entries of the sub-table include a prefix used for the searching, a next-hop address, and an output port.

19. The hardware architecture according to claim 12, wherein the entries of the main table include a prefix used for the searching, a pointer pointing to a forwarding RAM, a pointer pointing the sub-table, and collision times corresponding to the entries, and
wherein the entries of the sub-table include a prefix used for the searching and a pointer pointing a forwarding RAM.

20. The hardware architecture according to claim 19, wherein the forwarding RAM includes a next-hop address and an output port.

21. The hardware architecture according to claim 12, wherein the main table and the sub-table are stored in a separate SRAM based on the prefix lengths of the IP address.

22. The hardware architecture according to claim 12, wherein the information on the matched entries includes information on a next-hop address and an output port or information on a pointer pointing a forwarding RAM.

23. An IP address lookup method using multiple hash functions, the method comprising steps of:
(a) performing at least one hashing process on an incoming IP address based on prefix lengths of the IP address to generate a prefix of the incoming IP address that is shorter than the incoming IP address;
(b) comparing prefixes, each of which is stored at a location in a forwarding table pointed by a hashing value with the prefix of the incoming IP address;
(c) comparing prefixes, each of which is stored in an overflow table with the prefix of the incoming IP address;
(d) if the prefix compared in Step (b) or (c) matches with the prefix of the incoming IP address, forwarding information on the prefix-matched entries; and
(e) selecting an entry having a longest-matched-prefix among the prefix-matched entries by using the information forwarded in Step (d).

24. The method according to claim 23, wherein the IP address lookup in the forwarding table or the overflow table is performed on the prefix lengths of the IP address in parallel.

25. The method according to claim 23, wherein the prefixes of the IP address are classified based on the prefix lengths, and at least one forwarding table is generated to correspond to each of the prefix lengths.

26. The method according to claim 23, wherein the forwarding table is stored in a single SRAM based on the prefix lengths of the IP address.

27. The method according to claim 23, wherein the hashing process is performed by using a CRC hash function.

28. The method according to claim 23, wherein the entries of the forwarding table include a field indicating the number of loads storing the prefixes, a prefix field used for the searching, and a forwarding RAM pointer field.

29. The method according to claim 23, wherein the information on the prefix-matched entries includes a pointer pointing to a forwarding RAM.

30. The method according to claim 23, wherein at least one hashing value is provided by the hashing hardware unit at predetermined time intervals.

31. The method according to claim 23, wherein the overflow table is constructed with a content addressable memory (CAM).

32. An IP address lookup hardware architecture using multiple hash functions, the method comprising steps of:

a hashing hardware unit for performing a hashing process on an incoming IP address to generate a prefix of the incoming IP address that is shorter than the incoming IP address;

a main processor having an overflow table and at least one forwarding table storing entries in a form of a hashing table based on prefix lengths of the IP address, the main processor having functions of: comparing prefixes, each of which is stored at a location in a forwarding table pointed by a hashing value with the prefix of the incoming IP address; comparing prefixes, each of which is stored in an overflow table with the prefix of the incoming IP address; and forwarding information on the prefix-matched entries; and a priority encoder for selecting an entry having a longest-matched-prefix among the prefix-matched entries by using the forwarded information on the prefix-matched entries.

33. The hardware architecture according to claim 32, wherein the IP address lookup in the forwarding table or the overflow table is performed on the prefix lengths of the IP address in parallel.

34. The hardware architecture according to claim 32, wherein the prefixes of the IP address are classified based on the prefix lengths, and at least one forwarding table is generated to correspond to each of the prefix lengths.

35. The hardware architecture according to claim 32, wherein the forwarding table is stored in a single SRAM based on the prefix lengths of the IP address.

36. The hardware architecture according to claim 32, wherein the hashing hardware unit is a CRC hardware unit using a CRC hash function.

37. The hardware architecture according to claim 32, wherein the entries of the forwarding table include a field indicating the number of loads storing the prefixes, a prefix field used for the searching, and a forwarding RAM pointer field.

38. The hardware architecture according to claim 32, wherein the information on the prefix-matched entries includes a pointer pointing to a forwarding RAM.

39. The hardware architecture according to claim 32, wherein at least one hashing value is provided by the hashing hardware unit at predetermined time intervals.

40. The hardware architecture according to claim 32, wherein the overflow table is constructed with a content addressable memory (CAM).

41. A method of generating a forwarding table used for IP address lookup, the method comprising steps of:
(a) performing at least one hashing process on an incoming IP address based on prefix lengths of the IP address;
(b) storing prefixes in a bucket having the lowest load among buckets pointed by at least one hashing value; and
(c) if there is no storage space in the forwarding table, storing the prefixes in buckets of an overflow table.

42. The method according to claim 41, wherein the incoming IP address is input bit-by-bit to the hashing hardware unit.

43. The method according to claim 41, wherein the prefixes are classified based on the prefix lengths, and at least one forwarding table is generated to correspond to each of the prefix lengths.

44. The method according to claim 41, wherein the forwarding table is stored in a single SRAM based on the prefix lengths of the IP address.

45. The method according to claim 41, wherein the hashing process is performed by using a CRC hash function.

46. The method according to claim 41, wherein the entries of the forwarding table include a field indicating the number of loads storing the prefixes, a prefix field used for the searching, and a forwarding RAM pointer field.

47. The method according to claim 41, wherein at least one hashing value is provided by the hashing hardware unit at predetermined time intervals.

48. The method according to claim 41, wherein the overflow table is constructed with a content addressable memory (CAM).

* * * * *